March 7, 1967  D. G. KOPE  3,307,434
SPEED REDUCING MECHANISM
Filed June 22, 1964  2 Sheets-Sheet 1
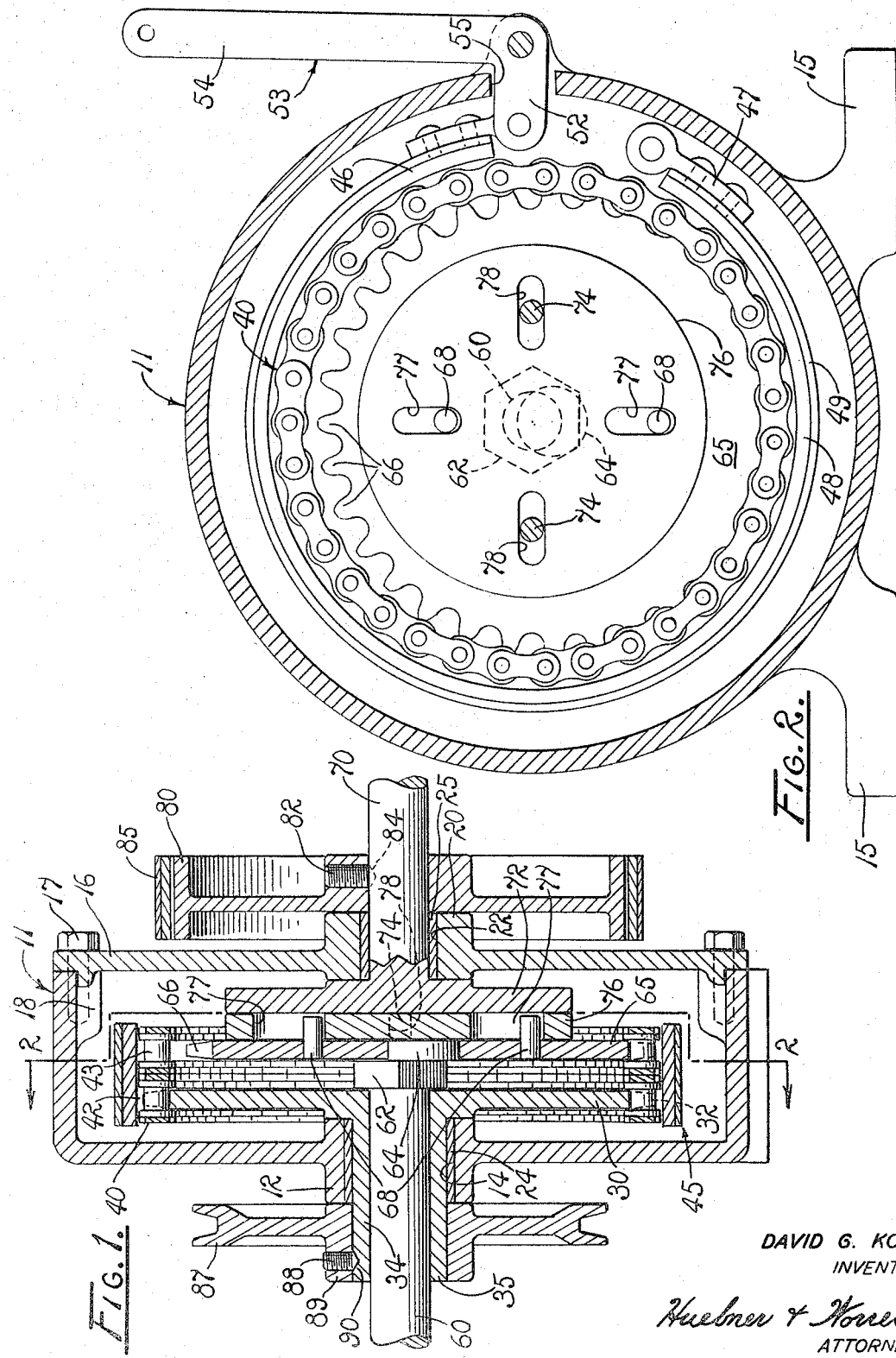
DAVID G. KOPE
INVENTOR
Huebner & Worrel
ATTORNEYS March 7, 1967 D. G. KOPE 3,307,434
SPEED REDUCING MECHANISM
Filed June 22, 1964 2 Sheets-Sheet 2

DAVID G. KOPE
INVENTOR

Huebner & Worrel
ATTORNEYS

United States Patent Office 3,307,434
Patented Mar. 7, 1967

3,307,434
SPEED REDUCING MECHANISM
David G. Kope, 8674 S. Reed Ave.,
Reedley, Calif. 93654
Filed June 22, 1964, Ser. No. 377,001
4 Claims. (Cl. 74—804)

The present invention relates to a speed reducing mechanism for power take-off pulley differential drives and the like and more particularly to such a mechanism of the planetary type which provides relatively higher ratio gear reductions and requires less space than conventional speed reducing devices.

Speed reducing units are commonly employed for driving various power tools from a high speed source of power such as power take-off drives from tractors and the like. Such units usually provide a plurality of spur gear trains which, in order to provide the desired speed reduction, require that their power input and output shafts be spaced widely apart to accommodate the gear trains. This greatly complicates assembly and connection of the unit, particularly in installations having restricted space. Such spacing of the shafts is, of course, proportionately greater with the larger gear diameters needed for a greater ratio of speed reduction between the input and output shafts. Where a relatively high ratio of reduction is desired, the diameter of the gears and spacing of the input and output shafts is frequently so great that a lesser ratio of reduction is tolerated. Furthermore, considerable power loss is experienced through such multigear speed reducing gear trains.

Therefore, it is an object of the present invention to provide an improved speed reducing mechanism capable of providing maximum speed reduction in a minimum of space.

Another object is to provide a speed reducing mechanism of the character described which is readily adapted for installation in coaxial relation in existing power drive shafts.

Another object is to provide such an improved speed reducing mechanism which enables the power input and output shafts thereof to be disposed in coaxial relation.

Another object is to provide a speed reducing mechanism which is capable of providing a high ratio of speed reduction in forward and in reverse without additional reverse gearing.

Another object is to provide a speed reducing mechanism employing sprockets and endless chains which is simple, compact, and requires a minimum of maintenance.

Other objects and advantages of the present invention will subsequently become more clearly apparent upon reference to the following description in the specification.

In the drawings:

FIG. 1 is a central vertical section through a first embodiment of the speed reducing mechanism of the present invention.

FIG. 2 is a transverse vertical section through the speed reducing mechanism taken in a plane represented by the line 2—2 of FIG. 1.

Figure 3:
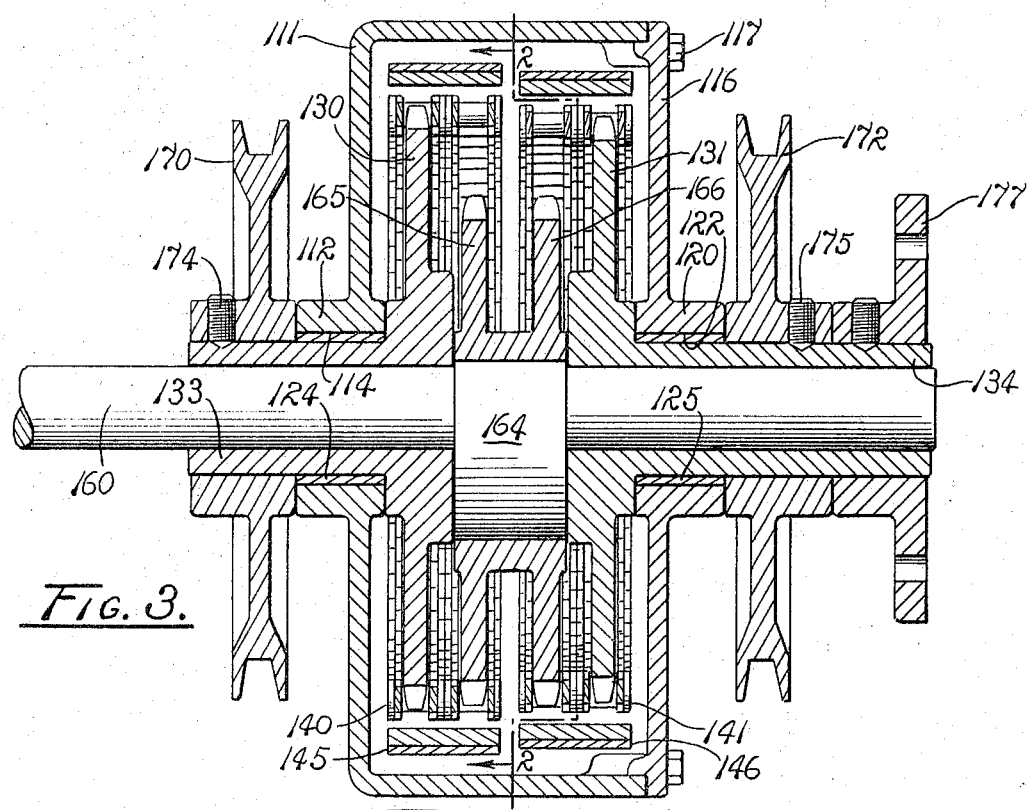
FIG. 3 is a central vertical section through a second embodiment of the speed reducing mechanism of the present invention.

Referring more particularly to the drawings, a speed reducing mechanism embodying the principles of the present invention is shown in FIG. 1 providing a housing 11 which has a centrally disposed circular flange 12 circumscribing a bore 14. The housing includes a plurality of support feet 15 which are adapted to be secured to any suitable support surface, not shown. A cover 16 is mounted in closing relation on the housing by a plurality of cap screws 17 screw-threadably received within boss portions 18 of the housing. The cover provides a circular flange 20 circumscribing a bore 22 of a smaller diameter than the bore 14 in the housing but disposed in spaced coaxial relation therewith. Each of the bores 14 and 22 mounts a sleeve bearing 24 and 25, respectively.

A relatively large diameter support sprocket 30 is disposed within the housing and provides a plurality of peripherally extended teeth 32. An integral tubular quill shaft portion 34 is extended from the sprocket outwardly of the housing in rotatable relation through the bearing 24 and terminates in an outwardly exposed end 35. An endless circular dual sprocket chain 40 has a pair of side-by-side sprocket engaging runs or paths 42 and 43. The sprocket engaging path 42 is disposed tightly about the large diameter support sprocket 30 in meshing engagement with the teeth 32 thereof.

A circular brake band 45 is disposed in subtsantially circumscribing relation about the dual sprocket chain 40 and provides an upper actuating end 46 and a lower anchoring end 47. The brake band includes an inner ring of any suitable friction material 48 and an outer band 49 of flexible sheet metal material. The upper actuating end 46 of the brake band is connected to the inner end 52 of an elongated bell crank 53 having an upper handle end 54. The bell crank is pivotally mounted on the housing with the inner end 52 thereof extended through an opening 55 in the housing for movement of the handle end 54 in a counterclockwise direction, as shown in FIG. 2, to tighten the brake band 45 in holding relation about the dual sprocket chain 40.

An elongated input driving shaft 60 is rotatably extended through the quill shaft portion 34 of the large sprocket 30 and is axially constrained against the face of the sprocket by an annular shoulder 62. The driving shaft is adapted to be driven by a high speed power source, not shown. An integral crank portion 64 is inwardly extended from the large diameter portion 62 in eccentric relation to the longitudinal axis of the input driving shaft 60.

An integral idler or driven sprocket 65 of a smaller diameter than the support sprocket 30 is journaled on the crank portion 64 for rotation about an axis eccentrically of the axis of the input driving shaft 60. The idler sprocket provides a plurality of peripherally extended teeth 67 which are disposed in meshing engagement with the sprocket engaging path 43 of the dual sprocket chain 40 in the direction of eccentricity of the crank portion from the driving shaft. In the direction opposite to the eccentricity of the crank portion the teeth 67 are disposed completely out of engagement with the sprocket chain. In actual practice, it is desirable that as many of the teeth 67 as possible be in meshing engagement. For example, if the large diameter support sprocket 30 is provided with thirty-five teeth, the idler sprocket 64 preferably has thirty-two teeth so that only a minimum amount of clearance is provided between the non-meshing teeth and the sprocket chain. A pair of diametrically opposed pins 68 are extended outwardly from the idler sprocket in right angular relation to the plane of the sprocket in equally spaced relation from its axis of rotation on the crank portion 64 of the driving shaft 60.

An elongated output shaft 70 is rotatably disposed through the bearing 25 in the cover 16 of the housing 11. The output shaft includes an integral circular flange 72 within the housing to preclude axial withdrawal of the output shaft therefrom. A pair of pins 74 are mounted in the flange in diametrically opposed equally spaced relation from the longitudinal axis of the output shaft a distance equal to the spacing of the pins 68 of the idler sprocket. A coupling plate 76 having pairs of diametrically opposed elongated slots 77 and 78 therethrough is interposed the idler sprocket and the circular flange 72 of the output shaft in interconnecting relation. Such connection is accomplished by extension of the pins 68 and 74 through respective pairs of the diametrically opposed slots 77 and 78.

A brake drum 80 is mounted on the output shaft 70 for rotation therewith by a set screw 82 tightened into a circular notch 84 in the output shaft. A brake band 85 is disposed in circumscribing relation about the brake drum for selective stopping and holding of the output shaft 70 by an actuating handle, not shown, similar to the bell crank 35 of the brake band 45. A pulley wheel 87 is mounted on the outer end 35 of the quill shaft portion 34 of the support sprocket 30 by a set screw 88 carried in the hub 89 of the pulley in tightly engaging relation with a circular notch 90 in the quill shaft.

Second form

Figure 4:
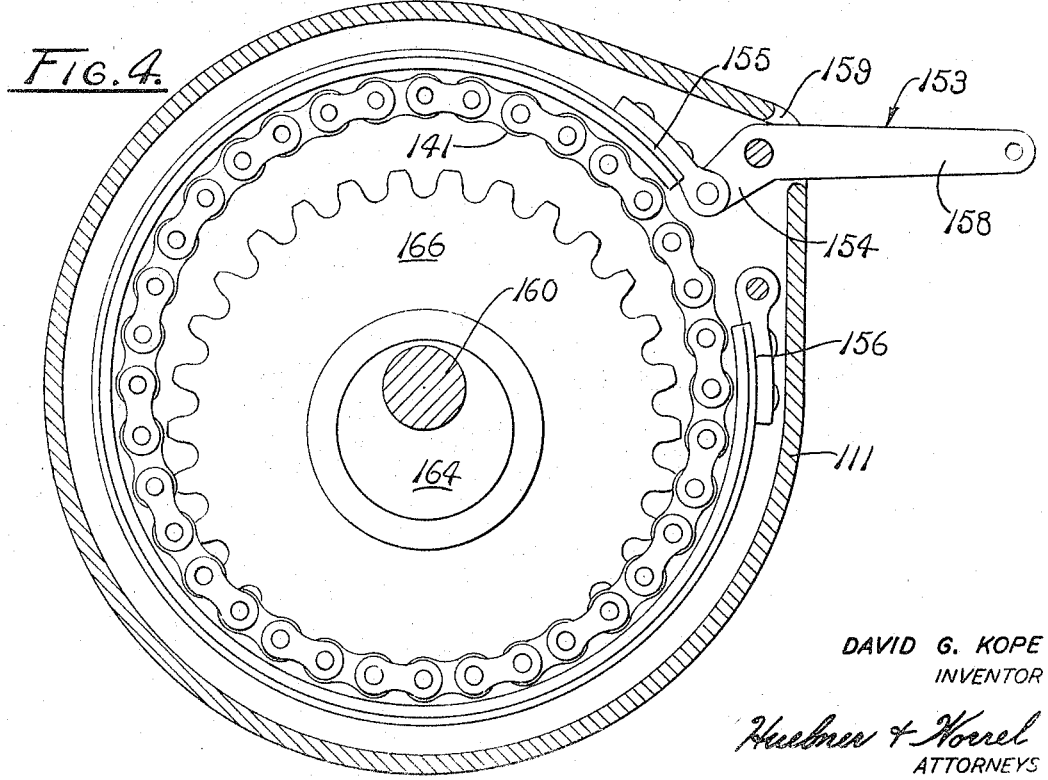
FIG. 4 is a transverse vertical section through the speed reducing mechanism of FIG. 3 taken in a plane generally indicated by the line 4—4 of FIG. 3.

A second form of the present invention is shown in FIGS. 3 and 4 having a housing 111 providing a central circular flange 112 circumscribing a bore 114. A cover 116 is mounted on the housing by a plurality of cap screws 117 and provides a circular flange 120 circumscribing a bore 122. A pair of sleeve bearings 124 and 125 are tightly disposed within the bores 114 and 122.

A pair of large diameter support sprockets 130 and 131 are individually rotatably mounted in the housing 111 by having their respective quill shaft portions 133 and 134 individually rotatably extended through the sleeve bearings 124 and 125. A pair of dual path sprocket chains 140 and 141 are individually mounted in tightly circumscribing relation about the sprockets 130 and 131, respectively. A pair of brake bands 145 and 146 are respectively disposed in circumscribing relation about the sprocket chains 140 and 141. As best shown in FIG. 4, each of the brake bands is actuated by a bell crank 153 pivoted intermediate its ends on the housing and having an inner end 154 connected to an upper actuating end 155 of the band with the opposed anchor end 156 of the band connected to the housing. The bell crank further includes an outer handle end 158 extended through an opening 159 in the housing.

An elongated input driving shaft 160 is rotatably journaled within the quill shaft portions 133 and 134 of the large sprockets 130 and 131. The driving shaft includes a crank portion 164 centrally disposed within the housing between the large sprockets 130 and 131.

A pair of idler sprockets 165 and 166 are journaled on the crank portion 164 of the input driving shaft 160 in joined or integral relation and in rolling meshing engagement with the respective inner sprocket engaging paths of the sprocket chains 140 and 141. A pair of output drive pulleys 170 and 172 are individually mounted for rotation with the outwardly extended quill shaft portions 133 and 134 of the large sprockets 130 and 131 by set screws 174 and 175, respectively. A coupling flange 177 is mounted for rotation about the quill shaft portion 134 of the sprocket 131 outwardly of the drive pulley 172 for connection with a similar coupling flange, not shown.

Operation of the first form

The operation of both forms of the subject invention is believed to be clearly apparent and that of the first form is briefly summarized at this point. Referring to FIGS. 1 and 2, in order to provide a straight-through or in-line speed reducing drive through the mechanism of the present invention, the outwardly extended ends, not shown, of the input driving shaft 60 and the output shaft 70 are provided with suitable couplings for connection with similar couplings in the power shaft between the power source and the tool or other mechanism to be driven. The housing 11 is rested upon a support surface and secured thereto by suitable bolts or screws extended through the feet 15 of the housing. Upon rotation of the input driving shaft 60, the crank portion 64 thereof orbits the idler sprocket 65 in rolling engagement around within the inner sprocket engaging path 43 of the dual sprocket chain 40. With the bell crank handle 54 swung to the left, as viewed in FIG. 2, in a counterclockwise direction, the brake band 45 is tightened against the dual sprocket chain 40 to hold the chain against rotation. It is noted that the support sprocket 30 is also held stationary by such locking of the sprocket chain.

During the above described movement of the idler sprocket 65, the teeth 67 thereof meshing with the sprocket chain cause the idler sprocket to be rotated around its own axis at a greatly reduced speed from the speed of rotation of the input driving shaft 60. Such rotation is transmitted to the output shaft 70 by way of the coupling plate 76 and pins 68 and 74 which are permitted movement through their respective coupling plate slots 77 and 78 to accommodate the eccentric movement of the idler sprocket 65.

Rotation of the output shaft 70 is controlled by operation of the brake band 85 extended about the brake drum 80 on the output shaft. If it is desired to stop rotation of the output shaft, the brake band 85 is applied sufficiently to overcome the drive through the speed reducing mechanism. During such braking of the output shaft, the handle end 54 of the bell crank 53 is returned to the right to loosen the brake band 45 from around the dual sprocket chain 40. When the output shaft is held, the rotation of the idler sprocket 65 provides a positive drive to the sprocket chain to rotate the large sprocket 30 and the pulley 87 in a reverse direction to the prior direction of rotation of the output shaft 70. Again, eccentric rotary movement of the idler sprocket is permitted by movement of the pins 68 and 74 through the respective slots 77 and 78 in the coupling plate 76.

When it is desired to resume rotation of the output shaft 70, the brake bands 85 and 45 are respectively released and applied so that they actually serve as clutches to start and stop rotation of the output shaft 70 and the reverse drive pulley 87 without stopping rotation of the input shaft 60.

Operation of the second form

The second form of the present invention, as shown in FIGS. 3 and 4, provides a forward and reverse speed reduction drive which is obtained by combining two of the basic units of the first form of the present invention in side-by-side relation. As in the first form, the input driving shaft 160 of the second form is rotated by a high speed power source, not shown. During such rotation, the idler sprockets 165 and 166 are orbited concentrically around the input driving shaft by the crank portion 164 in meshing rolling engagement with their respective inner portions of the sprocket chains 140 and 141.

In order positively to drive the output drive pulley 172, the brake band 145 is tightened about the sprocket chain 140 through the actuating bell crank 153 to hold the large sprocket 130 against rotation. The sprocket chain 140 thereby serves as a reaction element during rotation of the idler sprocket 165 and through the idler sprocket 166 to drive the sprocket chain 141. Such movement rotates the support sprocket 131 and the output drive pulley 172 and the coupling flange 177 in the same direction of rotation as the input driving shaft 160 but at a greatly reduced speed.

In order to drive the output drive pulley 107 in a reverse direction to the rotation of the input drive shaft 160, and to the direction of rotation of the previously described output drive pulley 107, the brake band 145 is released and the brake band 146 is applied to hold the sprocket chain 141 against rotation. The sprocket chain 141 now serves as a reaction element against the idler sprocket 166 which enables the idler sprocket 165 to rotate the sprocket chain 140. Such movement rotates the support sprocket 130 and the output drive pulley 170 in a reverse direction to the previously described rotation of the output drive pulley 172 even though the input driving shaft 106 is continuously driven in the same direction. Such phenomena occurs by reason of the support sprocket 131 and the sprocket chain 141 having a fewer number of teeth than the support sprocket 130 and the sprocket chain 140. Accordingly, this embodiment of the present invention provides a simple, compact and highly efficient forward and reverse unit which may, as in the first form, be placed in coaxial relation in a power drive shaft and concurrently provides forward and reverse drive pulleys for auxiliary drives therefrom in forward and reverse.

In view of the foregoing, it is readily apparent that the structures of the present invention have provided improved speed reducing mechanisms which are easily adapted for coaxial mounting in power shafts and which provide a high ratio of speed reduction. Such high reduction is accomplished by the novel association of the eccentrically driven idler sprockets within an endless chain-type ring gear which requires substantially less space than conventional speed reducing drive devices providing the same reduction. Furthermore, the structure is easily compounded, as shown in the second form of the invention which further displays the versatility and compact structure of the present invention.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A speed reducing mechanism comprising a driving element adapted to be rotated about a predetermined axis and having an eccentric crank portion, a reaction element providing an elongated flexible sprocket chain having a plurality of substantially equally spaced cylindrical members defining tooth receiving interstices therebetween, a support element mounting said reaction element in circumscribing concentric relation to said predetermined axis, brake means adapted releasably to hold said reaction element against rotation, a toothed driven element journaled on said crank portion of the driving element for rotation in eccentric orbiting relation about said predetermined axis and in meshing rolling engagement with said sprocket chain of the reaction element at a reduced speed from the speed of the driving element, an output member disposed in spaced coaxial relation to said driving element, and coupling means connecting said output member to said driven element.

2. A speed reducing mechanism comprising a driving element adapted to be rotated about a predetermined axis and having an eccentric crank portion, a reaction element, a support element mounting said reaction element in circumscribing relation to said predetermined axis and providing an output portion, first brake means adapted releasably to hold said reaction element against rotation, a driven element operatively connected to said crank portion of the driving element for orbiting rotation around said predetermined axis in engagement with said reaction element, an output member disposed in spaced coaxial relation to said driving element, coupling means connecting said output member to said driven element, and second brake means releasably to hold said output member against rotation during release of said brake means for rotation of said output portion of the support element at a reduced speed and in a reverse direction from the speed and direction of the driving element.

3. A speed reducing mechanism comprising a driving element adapted to be rotated about a first axis and having an eccentric crank portion, a reaction element, a support element journaled on said driving element mounting said reaction element in circumscribing concentric relation to said first axis and providing an output portion, first brake means releasably to hold said reaction element against rotation, a driven element journaled on said crank portion of the driving element for rotation about a second axis eccentrically disposed from said first axis so as to orbit around the first axis in engagement with said reaction element, an output member disposed in spaced coaxial relation to said driving element, coupling means connecting said output member to said driven element, and second brake means releasably to hold said output member against rotation during release of said first brake means for rotation of said output portion of the support element at a reduced speed and in a reverse direction from the speed and direction of the driving element.

4. A speed reducing mechanism comprising a driving element adapted to be rotated about a first axis and having an eccentric crank portion, a first toothed ring member circumscribing the driving element in concentric relation to said first axis, a second toothed ring member circumscribing the driving element in concentric relation to said first axis and in axially spaced relation to said first ring member, brake means individually engageable with said ring members for selectively alternately releasably constraining said ring members against rotation, a pair of circular toothed driven elements having a fewer number of teeth than said ring members journaled on said crank portion of the driving element for rotation about a second axis eccentrically disposed from said first axis so as to orbit around said first axis in individual meshing engagement with said ring members, a first circular toothed output member disposed in supporting continuous meshing relation with said first ring member for rotation in a predetermined direction at a reduced speed from the speed of the driving element when said brake means of the second ring member is applied, and a second circular toothed output member having a lesser number of teeth than said first output member disposed in continuous meshing engagement with said second ring member for rotation at a reduced speed from the speed of the driving element and in a direction opposite to said predetermined direction of the first output member when the brake means of the first ring member is applied.

References Cited by the Examiner

UNITED STATES PATENTS

| 1,293,123 | 2/1919 | Konetsky | 74—390 |
|---|---|---|---|
| 2,170,951 | 8/1939 | Perry | 74—804 |
| 3,115,791 | 12/1963 | Dean | 74—785 X |
| 3,151,495 | 10/1964 | Kurtz | 74—413 |
| 3,205,731 | 9/1965 | Black | 74—465 X |

FOREIGN PATENTS

| 588,423 | 5/1947 | Great Britain. |
|---|---|---|
| 961,052 | 6/1964 | Great Britain. |

DAVID J. WILLIAMOWSKY, *Primary Examiner.*

L. H. GERIN, *Assistant Examiner.*